Oct. 24, 1939.    R. D. KELLEGREW    2,177,300
GUIDE FOR DRILL STEELS
Filed Oct. 25, 1938
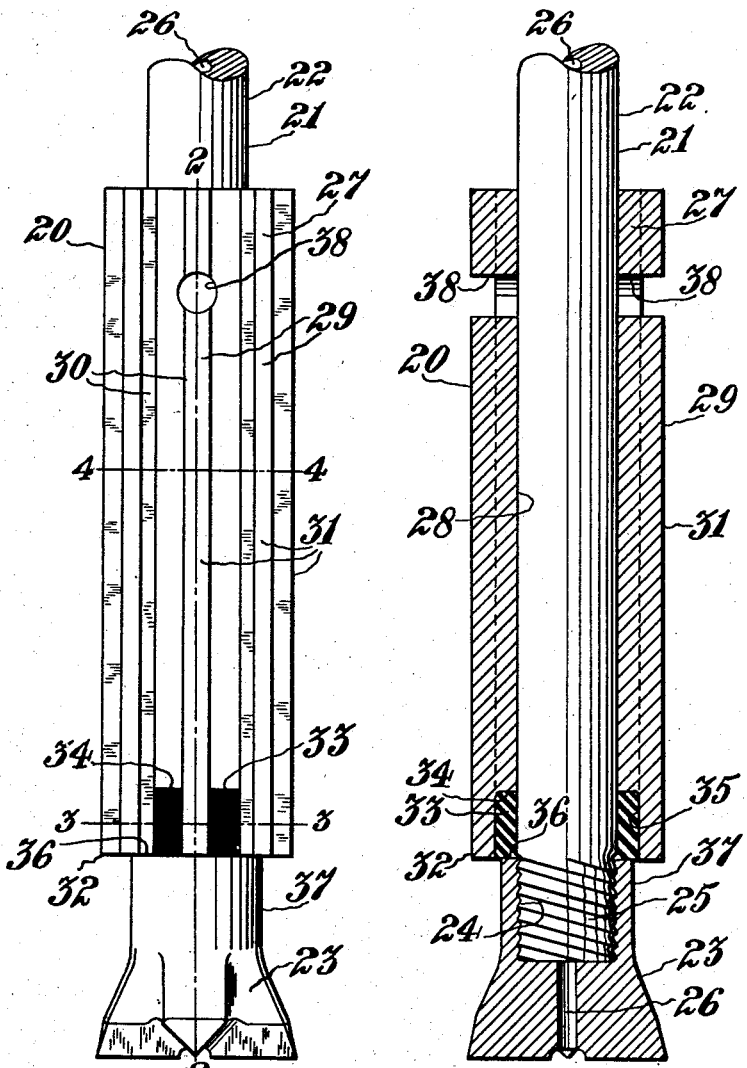
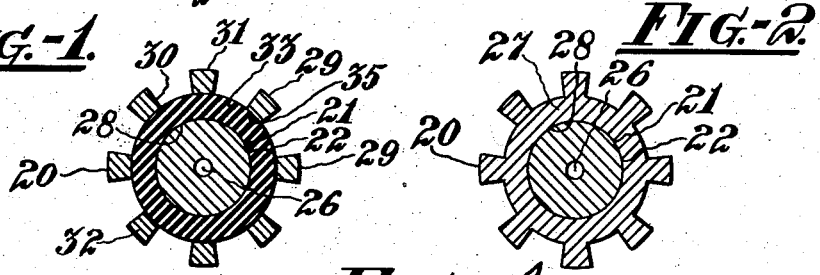
INVENTOR
Richard D. Kellegrew
BY
HIS ATTORNEY.

Patented Oct. 24, 1939

2,177,300

UNITED STATES PATENT OFFICE 2,177,300

GUIDE FOR DRILL STEELS

Richard D. Kellegrew, Newton Highland, Mass., assignor to Ingersoll-Rand Company, Jersey City, N. J., a corporation of New Jersey Application October 25, 1938, Serial No. 236,849

3 Claims. (Cl. 255—28)

This invention relates to guiding devices for working implements, and more particularly to a guide adapted to be inserted in a drill hole to form a bearing for the body portion of a drill steel.

In drilling holes in rock having abnormalities, as for example veins of extreme hardness, crevices or voids, it is a difficult matter to maintain the cutting bit of the drill steel in axial alignment with the rock drill.

The tendency of the drill steel to deflect from the desired course becomes more pronounced in deep-hole work where the drill steel, because of its length, is not sufficiently rigid to maintain the cutting bit in coaxial alignment with the rock drill. Thus, as the depth of the drill hole increases the cutting bit gradually departs from the predetermined line of cut and forms an inclined or crooked hole.

This result is particularly objectionable in quarrying operations in which blocks of material of predetermined dimensions are removed by first drilling closely spaced holes and then breaking down the intervening walls with a broaching tool. In work of this nature it is essential that the drill holes lie in approximately the same plane and in close parallelism in order to assure reasonable uniformity in the thickness of the material intended to be removed by the broaching tool.

One object of the invention is to maintain all portions of a drill hole in coaxial alignment.

A more specific object is to prevent bending of the body portion of a drill steel adjacent the cutting bit.

Other objects will be in part obvious and in part pointed out hereinafter.

In the drawing accompanying this specification and in which similar reference numerals refer to similar parts, Figure 1 is a side elevation of a guide constructed in accordance with the practice of the invention and a drill steel to which it is applied, Figure 2 is a transverse view, partly in section, taken through Figure 1 on the line 2—2, and Figures 3 and 4 are transverse sections taken through Figure 1 on the lines 3—3 and 4—4, respectively.

Referring more particularly to the drawing, 20 designates a guide constructed in accordance with the practice of the invention and 21 a drilling implement to which the guide 20 is applied.

The drilling implement 21 comprises a rod 22 and a drill bit 23 of a well known type having a socket 24 the interior of which is threaded for engagement with a threaded end 25 of the rod. The end of the rod 22 seats upon the bottom of the socket 24 and in the rod and the bit are registering passages 26 for conveying cleansing fluid from the rock drill, whereby the drilling implement is actuated, to the hole being drilled.

The guide 20 is in the form of an elongated body 27 having a hole 28 extending entirely therethrough to receive the rod 22. Sufficient clearance should exist between the body 27 and the rod 22 to enable the rod to rotate freely within the body without permitting any considerable degree of relative lateral movement between the two. On the periphery of the body 27 are a series of ribs 29 that extend along the entire length of the body and are suitably spaced with respect to each other to define channels 30 for the passage of detritus from the drilling face along the guide and through the drill hole to the top of the ground. The peripheral surfaces 31 of the ribs are curved to conform with the curvature of the wall of a drill hole into which the guide is placed for guiding the drilling implement.

The ribs 29 are of greater length than the body 27 and an end 32 of each rib extends beyond the body 27 while the opposite ends of the ribs terminate flush with the adjacent end of the body. The projecting ends 32 serve as retainers for a resilient buffer 33, preferably rubber, which is seated against an end 34 of the body 27 and with its peripheral surfaces against the adjacent inner surfaces 35 of the portions 32 of the ribs.

The buffer 33 is preferably of about the same length as the ends 32 of the ribs and seats against the end surface 36 of the skirt 37 of the drill bit 23. The diameter of the buffer 33 is slightly larger than the skirt 37 in order to prevent contact between the metallic portions of the guide and the drill bit. This is desirable since it avoids subjecting the drill bit 23 to the severe battering which it would otherwise receive as a result of the relative reciprocatory movement of the guide and the drilling implement during operation.

An aperture or apertures 38 are formed in the body portion to accommodate a fishing tool whereby the guide may be removed from a drill hole in the event that the drill bit 23 becomes detached from the drill rod and in which case the several elements are removed separately from the drill hole.

I claim:

1. A guide for drill steels, comprising a body having channels for the passage of detritus and a hole to slidably receive a drill steel, a yieldable buffer seated against an end surface of the body to engage a shoulder on a drill steel, and means on the body to engage the periphery of the yieldable buffer.

2. A guide for drill steels, comprising a body having a hole to slidably receive a drill steel, ribs on the outer surface of the body spaced with respect to each other to define passages for detritus and having portions extending beyond an end of the body, and a buffer arranged between the extending portions of the ribs.

3. A guide for drill steels, comprising a body having a hole to slidably receive a drill steel, ribs on the outer surface of the body spaced with respect to each other to define channels for detritus and having portions extending beyond an end of the body, and a buffer seated against an end of the body and against the inner surfaces of the extending portions of the ribs.

RICHARD D. KELLEGREW.